READBACK CIRCUIT FOR HIGH-DENSITY MAGNETIC BIT STORAGE

Filed Dec. 4, 1958 6 Sheets-Sheet 1

INVENTORS
Leonard H. Thompson
and John W. Wenner
BY
Sughrue & Rothwell
ATTORNEYS

READBACK CIRCUIT FOR HIGH-DENSITY MAGNETIC BIT STORAGE

Filed Dec. 4, 1958 6 Sheets-Sheet 2

INVENTORS
Leonard H. Thompson
and John W. Wenner
BY
Sughrue & Rothwell
ATTORNEYS INVENTORS
Leonard H. Thompson
and John W. Wenner
BY Sughrue & Rothwell
ATTORNEYS INVENTORS
Leonard H. Thompson
and John W. Wenner BY Sughrue & Rothwell
ATTORNEYS

READBACK CIRCUIT FOR HIGH-DENSITY MAGNETIC BIT STORAGE

Filed Dec. 4, 1958 6 Sheets-Sheet 5

INVENTORS
Leonard H. Thompson
and John W. Wenner
BY Sughrue & Rothwell
ATTORNEYS INVENTORS
Leonard H. Thompson
and John W. Wenner
BY Sughrue & Rothwell
ATTORNEYS United States Patent Office 3,049,698

Patented Aug. 14, 1962

3,049,698
READBACK CIRCUIT FOR HIGH-DENSITY MAGNETIC BIT STORAGE

Leonard H. Thompson and John W. Wenner, Poughkeepsie, N.Y., assignors to International Business Machines Corporation, New York, N.Y., a corporation of New York

Filed Dec. 4, 1958, Ser. No. 778,114
1 Claim. (Cl. 340—174.1)

This invention relates to a magnetic recording system for recording signals or bits on a magnetic surface and more particularly to such a system permitting accurate readback of the recorded signals despite extremely high signal densities.

The reading of bits stored on a magnetic surface is complicated at high bit densities by interference between adjacent bits. As the bit density increases the flux distribution of adjacent bits overlap and mutually affect each other. The readback signal under such conditions may exhibit phase shift and/or amplitude deterioration. At high bit densities this phase shift and amplitude deterioration may result in distorting the stored information to the extent that the readback signal is obscured.

There appear to be at least three possible schemes which can be employed to overcome the deleterious effects of interference between adjacent bits. The first scheme involves the reduction of the dimensions of the flux pattern of the bits to provide higher bit densities with less interference. The second scheme involves improvement of the readback circuit so as to better distinguish between adjacent bits. The third scheme involves the employment of a writing method which permits bit storage with optimum packing. The present invention relates principally to the second and third schemes, that is, said invention employs a writing method which when coupled with the readback circuit of this invention provides a readback signal of high fidelity even under conditions of extremely high bit density.

In accordance with this invention, the writing method employed is a frequency modulation method involving the use of two frequencies, a unit frequency and a double unit frequency. Recording equipment suitable for use in such systems is shown, for example, in Digital Computer Components and Circuits by R. K. Richards, D. Van Nostrand Company, Inc., 1957, pp. 314–351. One type of information may be stored on the magnetic surface by providing one complete cycle of flux change within a bit cell. The other type of information may be stored on the magnetic surface by providing only one-half cycle of flux change within the bit cell. A maximum response may then be obtained from the unit frequency type information (one-half cycle of flux change) provided the gap of the reading head is so dimensioned as to equal the wave length of the double unit frequency. With such a gap, a minimum response may be obtained from the double unit frequency type of information (one cycle of flux change). Consequently, if a two-frequency writing method is employed, a unit frequency and a double unit frequency, and for instance consecutive bits of the same informational type are written within the bit cells at the double unit frequency and changes from one type of information to the other are written within the bit cells at the unit frequency, then a maximum is obtained for the unit frequency type of information and a minimum response for the double unit frequency type of information. If, for instance, it is assumed that the flux distribution of a bit in a bit cell is one four-thousandths of an inch in diameter and that the flux pattern within the bit makes one complete cycle of change in flux direction, then this bit will provide a minimum readback signal when employing a recording head having a gap equal to one four-thousandths of an inch.

If this particular head having a one four-thousandths inch gap width reads a bit having one-half cycle of change in flux direction in the bit cell, the signal induced in the winding on the readback head will be at a maximum. By providing a gap width which is equal to the wave length of the double frequency and consequently to one-half the wave length of the unit frequency, the unit frequency type of information is detected and provides a maximum readback signal and the double unit frequency type of information is detected and provides a minimum readback signal.

It is therefore an object of this invention to provide a magnetic readback system which permits extremely high bit density storage on a magnetic storage surface with high fidelity readback signals.

It is a further object of the invention to provide a magnetic readback system for reading information stored by a two-frequency writing method on a magnetic storage surface and to provide a maximum readback signal for unit frequency information and a minimum readback signal for double unit frequency information.

It is another object of this invention to provide a magnetic readback system employing a reading head having a gap width which is equal to the wave length of the double unit frequency data and equal to one-half the wave length of the unit frequency data.

Another object of this invention is to provide a readback system employing a readback head having a gap width equal to one-half the wave length of unit frequency data in a two-frequency writing method in which the frequency of the other type of data is an even integer harmonic of said unit frequency.

These and other objects will become apparent from a description of the accompanying drawings.

Figure 4A:
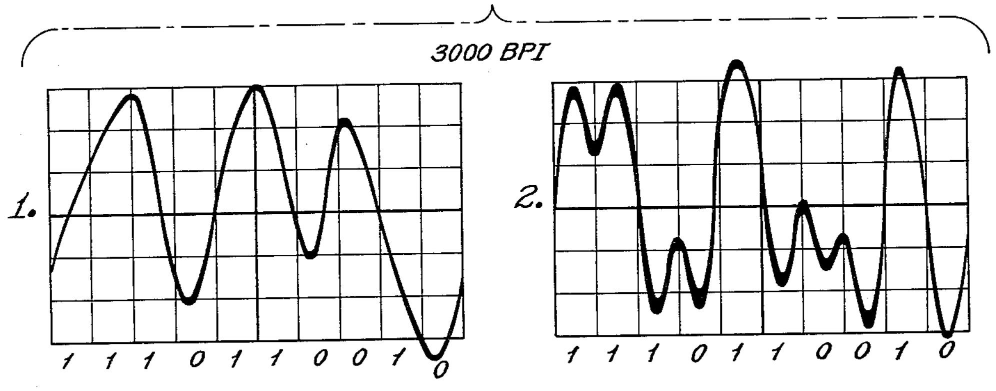

FIGURE 4*a* is a diagrammatic representation of two wave forms. Waveform No. 1 is the readback signal obtained using NRZI writing method for storing the number 1110110010. Wave form 2 is the readback signal obtained with the IMNRZ writing method for storing the number 1110110010. Both of these numbers were stored at a bit density of 3000 bits per inch.

Figure 4B:
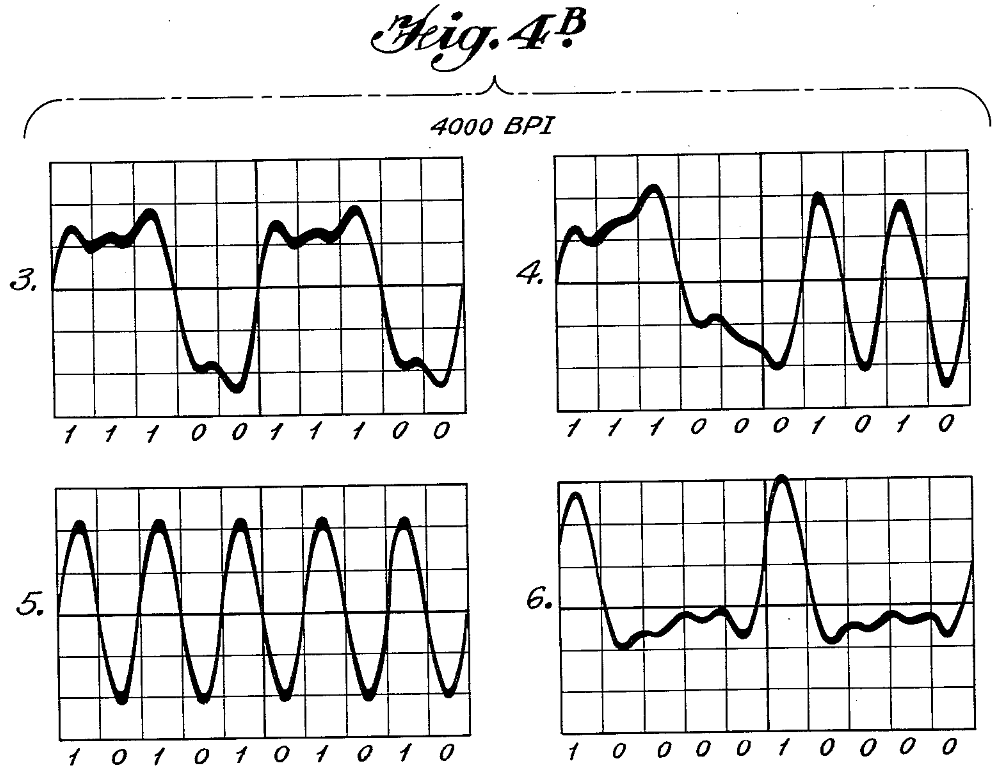

FIGURE 4*b* shows readback signals obtained at writing bit density of 4000 bits per inch. All of the readback signals were obtained with the IMNRZ writing system storing the numbers identified with each one of the curves 3, 4, 5, and 6.

Figure 4C:
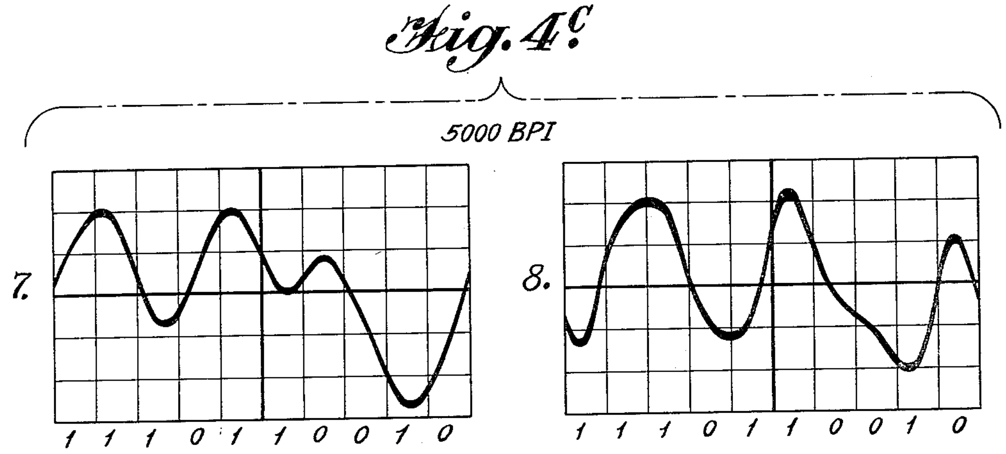

FIGURE 4*c* is a view showing the readback signal obtained at 5000 bits per inch. Curve 7 illustrates the NRZI system of writing and curve 8 the IMNRZ system.

Figure 4D:
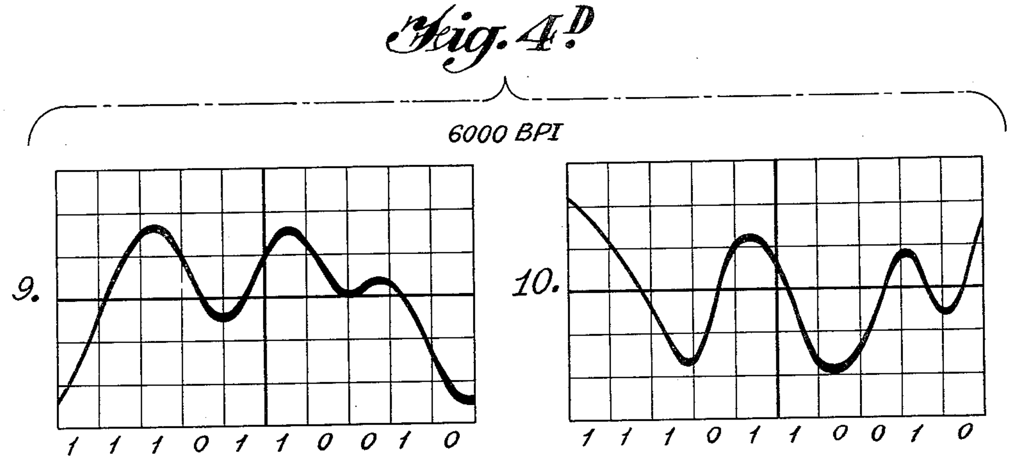

FIGURE 4*d* is a view showing the readback signal obtained at 6000 bits per inch and curve 9 illustrates the NRZI system of writing and curve 10 the IMNRZ system of writing.

Figure 5A:
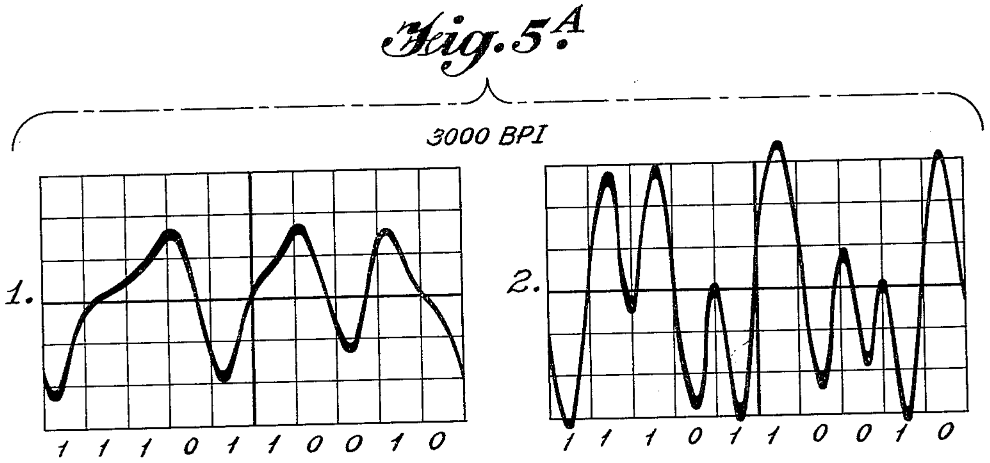

FIGURE 5*a* is a view showing the readback signal obtained at 3000 bits per inch. Curve 1 shows the readback signal obtained with the NRZI system of writing and curve 2 with the IMNRZ system of writing.

Figure 5B:
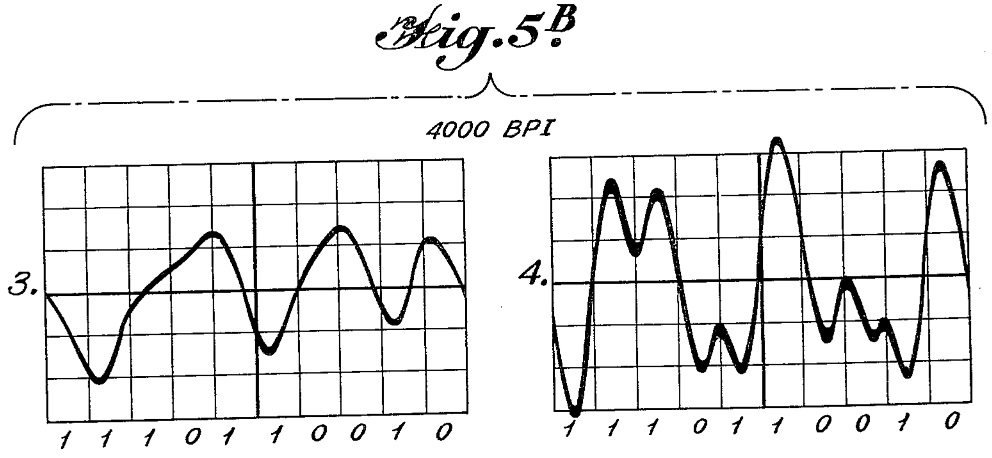
Figure 5C:
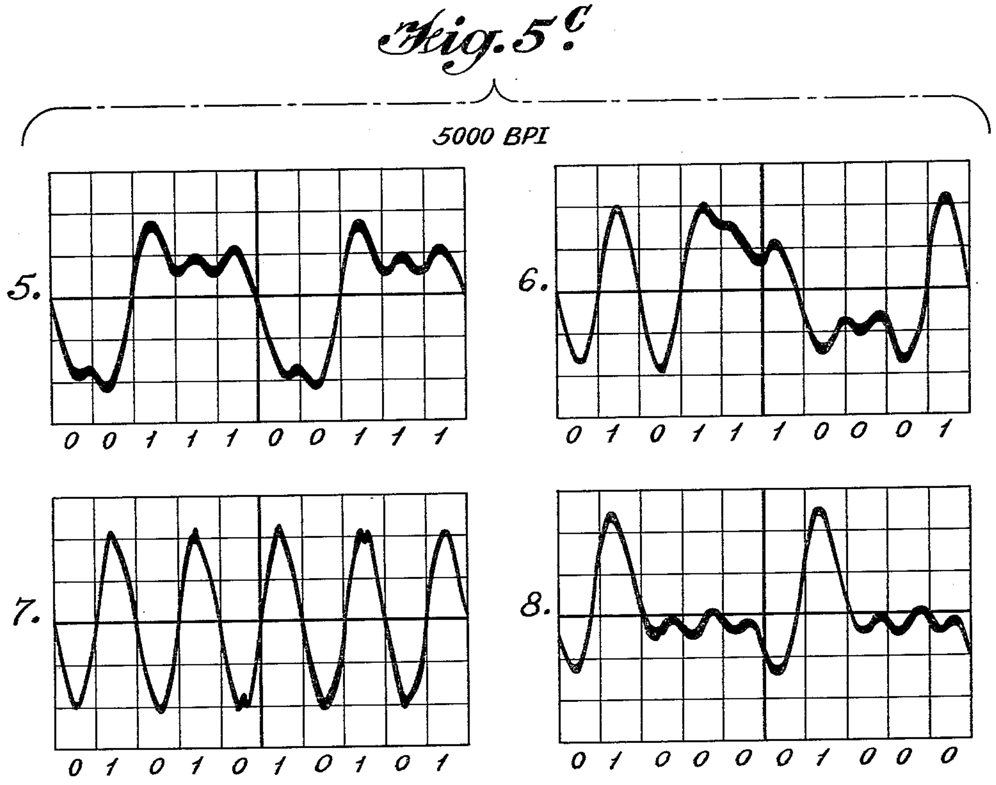
Figure 5D:
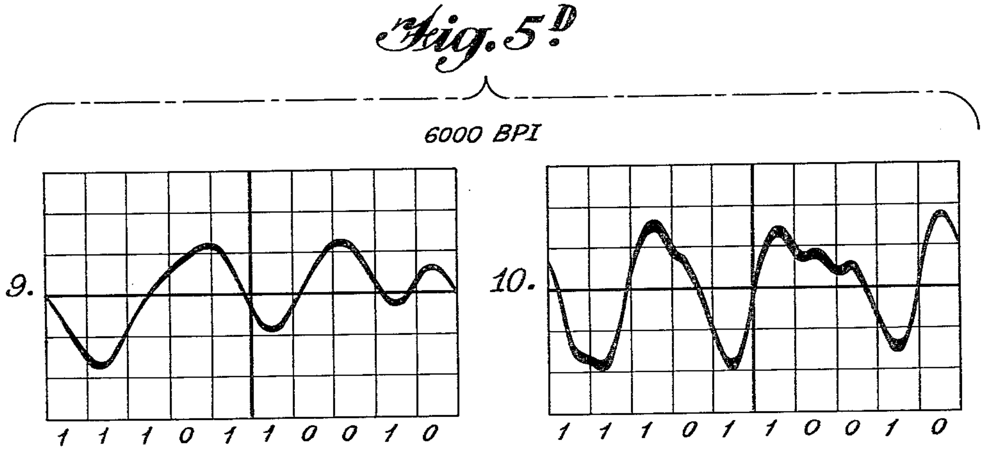

FIGURE 5*b* is a view showing the readback signal obtained at 4000 bits per inch. Curve 3 shows the readback signal obtained with the NRZI system of writing and curve 4 with the IMNRZ system of writing.

FIGURE *5c* is a view showing the readback signal obtained at 5000 bits per inch. Curves 5, 6, 7, and 8 are readback signals all obtained with the IMNRZ system of writing.

FIGURE *5d* is a view showing the readback signal obtained at 6000 bits per inch. Curve 9 is a readback signal obtained with the NRZI system of writing and curve 10 with the IMNRZ system of writing.

FIGURES *6a* and *6b* are diagrammatic illustrations of the readback circuit used in conjunction with the readback head constructed in accordance with this invention showing the means of discriminating between the two types of information and of the wave forms observed at various points in said circuit.

Figure 1:
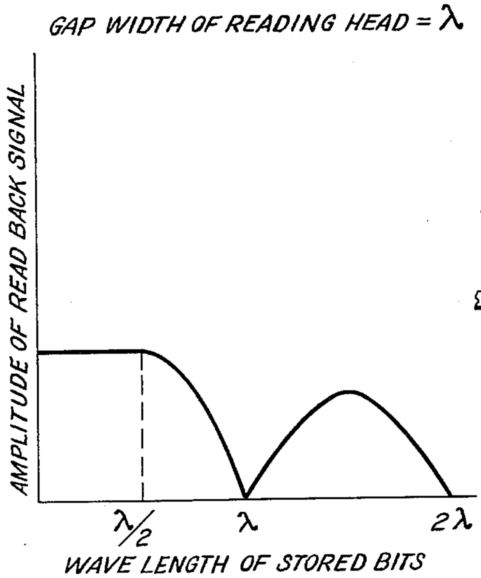
FIGURE 1 is a curve illustrating the amplitude of the readback signal for various wave lengths of stored bits when employing a reading head having a gap width equal to lambda ($\lambda$)

Referring first to FIGURE 1, there is shown a plot of the readback signal amplitude versus wave length of stored bits when employing a readback head having a gap width equal to lambda. It can be seen that when the wave length of the stored or written bit on the magnetic surface equals the gap width of the reading head, a minimum amplitude readback signal is detected. A maximum readback signal amplitude is obtained when the wave length of the stored bit equals lambda/2. Of course, the same result is obtained with harmonics of lambda and lambda/2 bits but for the purpose of obtaining maximum bit densities, the fundamental frequencies are preferably employed.

Figure 2:
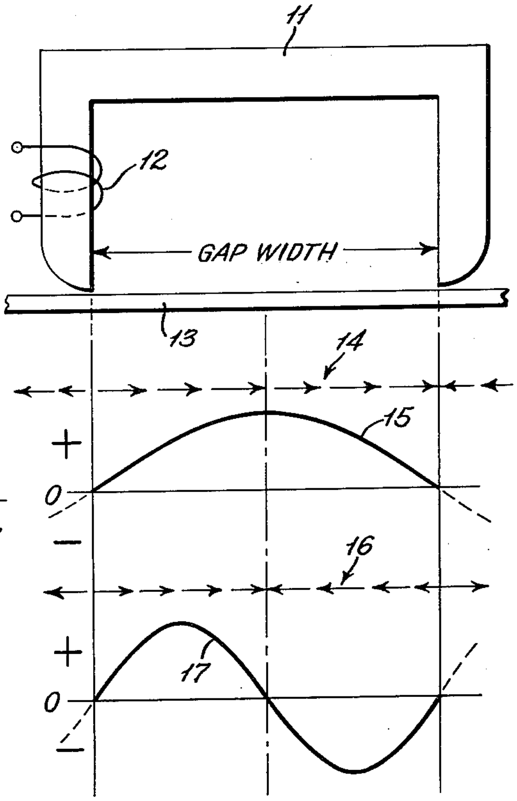
FIGURE 2 is a diagrammatic representation of the readback head with a reading coil mounted thereon and positioned in operating relation to a magnetic surface, the figure illustrating the flux pattern on the magnetic surface for the unit frequency type of information and for the double unit frequency type of information.

In FIGURE 2 the reading head 10 includes a core 11 of conventional core material and a readback winding 12 wound thereon. The magnetic surface 13 is illustrated here as a magnetic tape but may of course be any other equivalent type such as a drum or disc.

Let us consider a two-frequency writing method where the wave length of the double unit frequency and the gap width of the reading head equal lambda. A unit frequency bit is illustrated at 14 wherein the surface within the bit cell is magnetized at a plus remanence state as shown by the arrows indicating the equivalent bar magnets, all having the same polar direction. The flux pattern amplitude versus linear distance along the surface of the tape defined by the gap is shown by curve 15. As shown in FIGURE 1, the readback signal under these conditions as detected by the readback head and as induced in the coil 12 is a maximum signal. Curve 16 illustrates a double unit frequency bit wherein the surface within the bit cell is magnetized at a plus remanence state during the first half cycle and at a minus remanence state during the second half cycle. Curve 17 plots the flux pattern amplitude versus gap distance for this condition. Again as shown in FIGURE 1, a minimum response is detected in coil 12 for this double unit frequency type of information. The effect is to detect and amplify the unit frequency bit and to filter out the double unit frequency bit.

As has heretofore been stated, the writing method for which this system is particularly adapted is a two-frequency method. Any method employing frequency modulation to represent the bits in which a unit frequency represents one type of information and double unit frequency represents a second type of information finds utility here. By dimensioning the gap width of the recording head so as to be equal to the wave length of the double unit frequency component, optimum results are obtained. One such writing scheme is known as the Ferranti method. To illustrate this method, reference is made to FIGURE 3.

Figure 3:
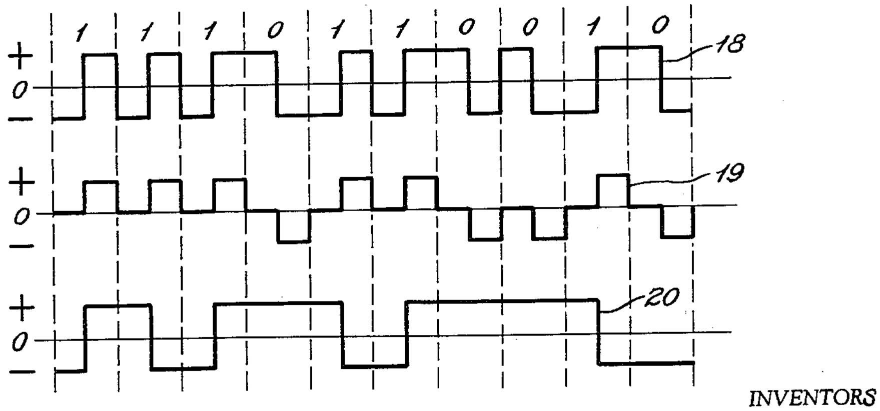
FIGURE 3 is a view showing the write current wave forms for various types of writing methods.

The wave form 18 of FIGURE 3 represents a writing current signal employed in accordance with the Ferranti method (an NRZ method) to store the binary number 1110110010 on the magnetic surface. It can be seen that a flux change in the positive direction is provided at the center of the bit cell to store 1 and in a negative direction to store 0. The vertical dotted lines in this figure define the bit cells. It can be seen that for consecutive bits of the same character (all 1's or all 0's) each cell contains a complete cycle of flux change. This is the double unit frequency component. In changing from a 1 to a 0 or a 0 to a 1 only one-half cycle of flux change is provided within the bit cell. This is the unit frequency component.

An example of an RZ (return-to-zero) method is shown by wave form 19. A positive pulse stores a 1 and a negative pulse a 0. Consecutive 1's or consecutive 0's provide a complete cycle of flux reversal within the bit cell and one-half cycle of flux reversal is provided when changing from a 1 to a 0 or vice versa. Another RZ method that may be employed is the double pulse method in which a positive pulse in the first half of the bit cell followed by a negative pulse in the second half of the bit cell stores a 0 and vice versa for a 1.

The RZ and Ferranti methods are non-limiting examples of two frequency methods of writing. Any system which writes one type of information at a first frequency and another at an even harmonic of this first frequency may be employed.

Another NRZ method commonly employed for storing information bits on a magnetic surface is known as the NRZI method (Non-Return to Zero IBM). This involves a change (either positive or negative) in flux direction in the center of the bit cell to store 1's and no change to store 0's. The write current wave form is shown in FIGURE 3 by the wave form 20 for the number 1110110010. This is a multi-frequency system involving as many frequencies as determined by the coded pattern. Consecutive 1's provide one-half cycle of flux change in the bit cell but flux changes within the bit cell for changing from a 0 to a 1 or a 1 to a 0 provide a flux change within a bit cell which is a function of the number of consecutive 0's which precede or succeed said change in code pattern. Therefore, the NRZI system is not a two-frequency system and is not applicable with the present invention. If a gap width were provided having a width equal to the wave length of the type of information in accordance with NRZI system indicating consecutive 1's, these consecutive 1's would be manifested by a readback signal having a minimum amplitude. However, since there is no constant frequency employed for changing from 1 to 0 or 0 to 1, the gap width would not bear a proper relation to these signals. Therefore with the NRZI system a minimum signal would be obtainable but not a maximum signal. If a maximum signal were obtainable, it would not be a fortuitous circumstance dictated by the coded pattern.

Referring first to FIGURES *4a*, *4b*, *4c*, and *4d*, these show the readback signals obtained at various bit densities, reading bits recorded with a 20 milliamp write current. It can be seen particularly with relation to FIGURE *4a* that at a bit density of 3000 bits per inch using either one of the writing methods involved, the wave lengths of the two types of information stored were not such as to provide proper resolution in the readback signal. It must be noted that in all of these readback signals two factors are involved which control the wave length of the recorded bit. The first is the write current and the second is the bit density. By reviewing FIGURE *4b*, it can be seen that the particular head employed had a gap width which precisely equalled one-half the wave length of the unit type of information and one wave length of the double unit type of information. Consequently, the optimum conditions of write current and bit density for this particular head is 20 milliamps write current and 4000 bits per inch. FIGURES *4c* and *4d* show that the head which provides optimum results at 20 milliamps write current and 4000 bits per inch does not provide optimum results at 5000 bits per inch and FIGURE *4d* shows the same thing with relation to 6000 bits per inch.

Turning to FIGURES *5a*, *5b*, *5c*, and *5d*, it can be seen that optimum results are obtained at 5000 bits per inch. The readback signal gives proper resolution of the storage signals. In this particular case, the same head was used as in connection with the FIGURE 4 curves but 5 milliamps write current was used. Consequently, it can be seen that the optimum conditions here are (1) 5 milliamp. write current and (2) a bit density of 5000 bits per inch. Under these conditions optimum results were not obtained at 3000 bits per inch, 4000 bits per inch, or 6000 bits per inch.

Figure 6A:
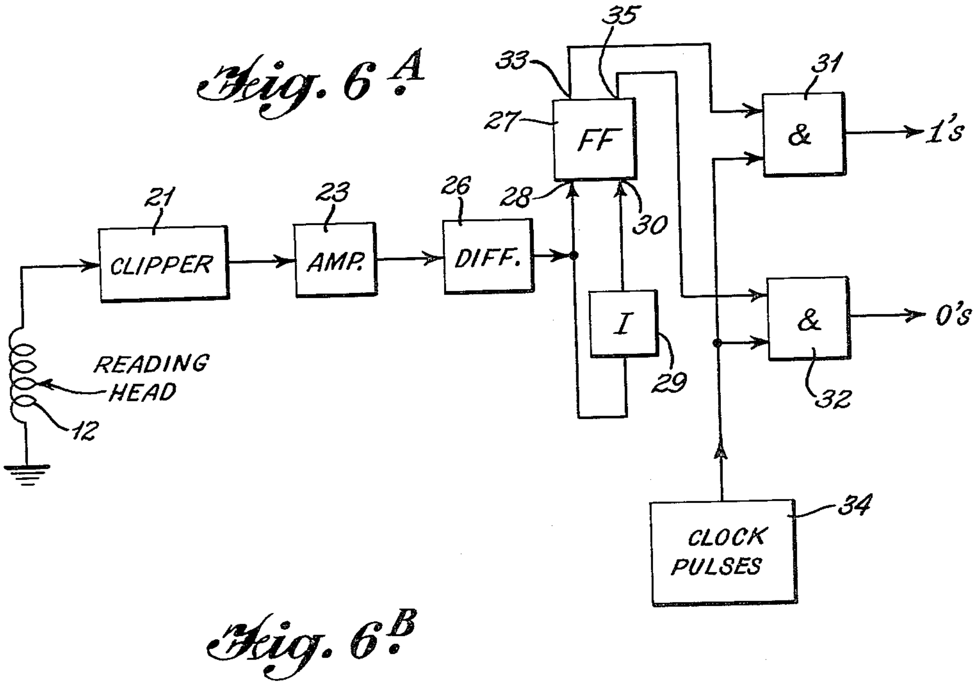
Figure 6B:
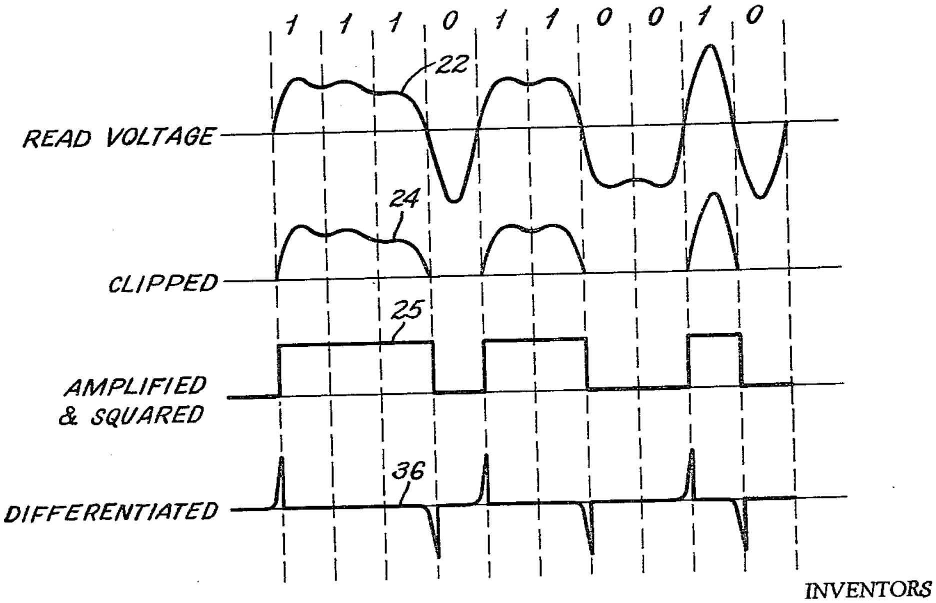

As shown in FIGURES 6*a* and 6*b*, the readback signal obtained at the coil 12 is fed to a conventional clipper 21. The wave form of the input to the clipper 21 is illustrated by the read signal 22. The clipper functions to provide an output to the amplifier 23 above the clipping level and blocks those signals below the clipping level. The wave form at the input to the amplifier 23 is shown by the clipped wave form 24. The amplifier 23 amplifies and squares the clipped wave form 24 to provide an output therefrom as illustrated by the wave form 25. The differentiator 26 differentiates the output of the amplifier and provides a wave form as illustrated by curve 36. The bistable flip-flop 27, of a conventional type, is provided with a set and reset input and a set and reset output. The set input 28 is provided with the differentiated wave form from the differentiator 26. This signal is also fed to the inverter 29 to invert the differentiated signal and the output of the inverter is fed to the reset input 30 of the flip-flop 27. A pair of AND gates 31 and 32 are provided. One of the inputs to AND gate 31 is connected to the set output 33 of the flip-flop 27. The other input to the AND gate 31 is connected to a source of clock pulses 34 providing clock pulses at the center of each bit cell. One input to the AND gate 32 is connected to the reset output 35 of the flip-flop 27. The clock pulses from source 34 are fed to the other input to AND gate 32. The flip-flop 27 is placed in its set condition by a positive pulse to its set input 28 to drive the set output thereof down. The clock pulses in this particular case are negative-going clock pulses and when they coincide with a down level at the set output 33 of the flip-flop 27 will provide an output from AND gate 31 indicative of a 1. The negative pulses from the differentiator 26 are inverted by the inverter 29 and provided as positive pulses to the reset input 30 of the flip-flop 27 to reset this flip-flop. This then will cause the reset output 35 to go down and the set output 33 to go up. AND gate 31 is then blocked and AND gate 32 is conditioned. Under this circumstance a clock pulse to AND gate 32 will provide a pulse to indicate a 0 output. Consequently, when an output is obtained from AND gate 31 this indicates 1's and when an output is obtained from AND gate 32 this indicates 0's.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

What is claimed is:

A magnetic recording system for data handling systems comprising a magnetic recording surface on which are recorded bits in accordance with the Ferranti system of recording characterized by the representation of each bit by one of two types of information, each of said bits being sequentially recorded as one of two distinct frequencies, one type of information being recorded at a unit frequency and another type of information being recorded at a double unit frequency, said magnetic recording surface being divided into bit cells, said unit frequency being recorded by magnetizing a bit cell at a positive remanence state throughout said bit cell, said double unit frequency being recorded by magnetizing a bit cell at a positive remanence state throughout the first half of said bit cell and at a negative remanence state throughout the second half of said bit cell, a magnetic transducer for reading said information, said transducer having a gap for positioning in information reading relation to said surface, said gap having a gap width equal to the wave length of said double unit frequency, said transducer producing a maximum output response when positioned in reading relation to a portion of said surface having said unit frequency recorded thereon, said transducer producing a minimum output response when positioned in reading relation to a portion of said surface having said double unit frequency recorded thereon, and means including a bistable device responsive to the output of said transducer for shaping said output, said bistable device being selectively set to one stable state by a maximum output response of said transducer and being set to the other stable state by a minimum output response of said transducer.

References Cited in the file of this patent

UNITED STATES PATENTS

| | | |
|---|---|---|
| 2,144,844 | Hickman | Jan. 24, 1939 |
| 2,840,800 | Chester | June 24, 1958 |

OTHER REFERENCES

Magnetic Recording Handbook, R. E. B. Hickman, published by Georges Newnes Ltd., London, 1956, pages 21 and 22.